United States Patent Office 3,027,294
Patented Mar. 27, 1962

3,027,294
PRODUCTION OF WATER-REPELLENT
ASBESTOS-CEMENT PRODUCTS
Phillip S. Bettoli, Belle Mead, and Clarence R. Eckert, Englewood, N.J., assignors to The Ruberoid Co., a corporation of New Jersey
No Drawing. Filed Dec. 17, 1959, Ser. No. 860,093
13 Claims. (Cl. 162—154)

This invention relates to resin-coated cement products and, more particularly, to asbestos-reinforced Portland cement products. The invention provides an improved resin-coated asbestos-cement product and an improved process for manufacturing a water-repellent asbestos-cement product coated with a continuous hydrophobic film of thermoplastic acrylic resins integrally bonded to its surface. The invention is particularly suitable for use in manufacturing water-repellent asbestos-cement shingles and sidings which do not undergo efflorescence or lose their water-repellency even after prolonged exposure to the weather.

Following is a simplified flow diagram of the process of the invention as it is preferably carried out:

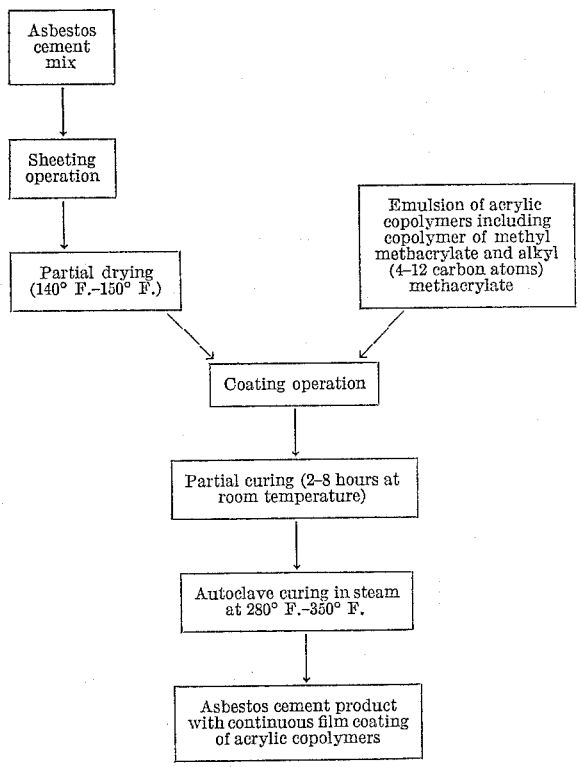

Virtually all cement products, including asbestos-reinforced cement products, tend to become discolored on prolonged outdoor exposure, primarily because of the efflorescence of calcium compounds contained in the cement. To prevent the occurrence of this efflorescence and to protect the cement against abrasion, it has been proposed to coat asbestos-cement products, of which shingles and sidings are but representative examples, with a hydrophobic polymer such as silicone, paraffinic hydrocarbon or polyethylene to block water penetration of the substrata. In general, coatings prepared from these polymer systems lack the capacity to bond to the surface of asbestos-cement, but instead adhere to the cementitious surface by entrapment in the surface interstices and pores where they form a discontinuous coating of discreet hydrophobic particles. Lacking any chemical affinity for the asbestos-cement surface, such coatings quickly erode from it. Moreover, coatings prepared from polyethylene, paraffinic waxes or silicone polymers are particularly susceptible to degradation upon being exposed to high pressure steam-curing of asbestos-cement products to which they have been applied, frequently losing their clarity and water-repellency.

Using a coating which consisted essentially of an aqueous emulsion of thermoplastic acrylic copolymers, including a film-forming hydrophobic copolymer of methyl methacrylate and an alkyl methacrylate in which the alkyl group contains from 4 to 12 carbon atoms, we have found that it is possible to bond a continuous hydrophobic film of thermoplastic acrylic resins integrally to the surface of asbestos-cement by autoclaving a partially cured asbestos-cement product bearing a semicontinuous coating of this resin system. Upon steam-curing such partially-cured and coated product, the resinous components of the coating are coalesced and fluxed into a continuous hydrophobic film which is integrally bonded to the surface of the autoclaved product. The resultant film is glossy in appearance and possesses distinctly hydrophobic properties and resistance to water strike-in, even after continued exposure to an outdoors atmosphere over a prolonged period of time.

Based on this discovery, the invention provides an improved process for manufacturing a water-repellent asbestos-cement product coated with a continuous hydrophobic film of thermoplastic acrylic resins integrally bonded to its surface which comprises coating at least one of the surfaces of a sheet of asbestos-cement while it is still in warm condition with an aqueous emulsion of thermosplastic acrylic copolymers including a film-forming hydrophobic copolymer of methyl methacrylate and an alkyl methacrylate in which the alkyl group contains from 4 to 12 carbon atoms, drying the emulsion to deposit a semicontinuous coating on the sheet and then autoclaving the coated sheet in a saturated atmosphere of high-pressure steam to steam-cure the coated asbestos-cement sheet, thereby coalescing and fluxing the resinous components into a continuous hydrophobic film integrally bonded to the surface of the steam-cured asbestos-cement product.

To produce a continuous hydrophobic film which is integrally bonded to the surface of the asbestos-cement upon steam-curing in accordance with the invention, the aqueous emulsion containing the thermoplastic acrylic resin system may be applied to the surface of the asbestos-cement while it is still in a wet, warm, and plastic condition, the residual heat in the asbestos-cement being sufficient to dry the aqueous emulsion and leave a semicontinuous coating of the resinous copolymers on the coated surface. To this end a freshly formed sheet of asbestos-cement which has been heated to a temperature of approximately 140° F. to 150° F. and its moisture content reduced to about 20 percent by weight, but which is still in a plastic condition, is sprayed or otherwise coated with an aqueous emulsion of the thermoplastic acrylic copolymers (the solids content of which ranges from about 10 to about 50 percent by weight) to deposit thereon from 0.75 to 1.5 grams of resinous solids per square foot of the sheet. The solids content of the coating composition is not critical, however, and may be varied over wide limits to obtain the desired film thickness.

At this point, the coated asbestos-cement sheets are so soft and plastic that they may be deformed merely by applying slight pressure, but they are tack-free and do not adhere to each other. The coated sheets are preferably stacked and stored for a period of about two to eight hours, during which time they undergo partial curing with substantial hardening of the asbestos-cement. The partially cured asbestos-cement sheets are then autoclaved in a saturated atmosphere of high-pressure steam at a temperature preferably in the range from about 280° F. to about 350° F. to steam-cure the asbestos-cement and to coalesce and flux the resinous components of the semi-continuous film into a continuous hydrophobic film integrally bonded to the surface of the steam-cured product.

Alternatively, the aqueous emulsion containing the thermoplastic acrylic resin system may be applied to the surface of the asbestos-cement sheet after it has air-cured for a sufficient period of time to develop enough rigidity to permit handling and trimming, but prior to autoclaving the sheet, when the resin system is applied to the asbestos-cement sheet by this procedure, the surface temperature of the sheet at the time the resin system is applied must be sufficiently high to dry the aqueous emulsion and partially dissipate the plasticizer. As before, the resultant asbestos-cement sheets are then autoclaved in a saturated atmosphere of high-pressure steam (at a temperature preferably in the range from about 280° F. to about 350° F.) to steam-cure the asbestos-cement and to coalesce and flux the resinous components of the semi-continuous film into a continuous hydrophobic film integrally bonded to the surface of the steam-cured product.

Both coating procedures are the full equivalent of each other, and yield products which are identical in all respects. No matter what coating procedure is employed, however, the aqueous emulsion of thermoplastic acrylic resins must be applied to the asbestos-cement sheet prior to autoclaving and steam-curing the sheet to coalesce and flux the resinous components of the coating into a continuous hydrophobic film which is integrally bonded to the surface of the steam-cured product.

Various thermoplastic acrylic resin systems may be employed in the aqueous coating emulsion in conjunction with the film-forming hydrophobic copolymer of methyl methacrylate and the higher alkyl methacrylates. Particularly satisfactory results have been obtained, however, by using an aqueous emulsion of thermoplastic acrylic copolymers consisting essentially of a hard copolymer of methyl methacrylate and ethyl acrylate together with a plasticized film-forming hydrophobic copolymer of methyl methacrylate and an alkyl methacrylate in which the alkyl group contains from 4 to 12 carbon atoms. For optimum results, the ratio of the hydrophobic copolymer to the hard copolymer in the film should be from about 0.5:1 to about 10:1 parts by weight, in which case the hard copolymer should contain, in the polymer molecule, from 80 to 90 percent by weight of methyl methacrylate, from 10 to 20 percent by weight of ethyl acrylate and from 0.2 to 0.5 percent by weight of methacrylic acid while the hydrophobic copolymer should contain, in the polymer molecule, from 10 to 30 percent by weight of methyl methacrylate and from 70 to 90 percent by weight of the alkyl methacrylate. The resin system may also contain varying amounts of a plasticizer, such as butyl Cellosolve (2-butoxyethanol) or dibutyl phthalate, to aid in the development of film continuity.

As a general rule, both the degree of repellency (or hydrophobic character) as well as the exterior durability of this repellency are increased when the number of carbon atoms in the alkyl group of the alkyl methacrylate moiety of the resin is increased. In addition, it is generally possible to use a greater proportion of hard copolymer to the hydrophobic copolymer in the resin system without any loss in the repellent properties when the chain length of the alkyl group of the alkyl methacrylate moiety of the hydrophobic copolymer is increased. By themselves, however, the hydrophobic copolymers do not possess sufficient hardness to function properly as a coating in manufacturing the asbestos-cement products of the invention, and consequently must be blended with a hard polymer or copolymer before they are applied to the asbestos-cement sheet.

In practice, the aqueous emulsion of thermoplastic acrylic copolymers used as a coating composition may be prepared by blending an aqueous dispersion of the hard copolymer with an aqueous dispersion of the plasticized film-forming hydrophobic copolymer. The hardness and block resistance of this resin system may be varied over a relatively wide range without materially altering its hydrophobic film-forming properties by varying the relative proportions of hard copolymer and hydrophobic copolymer in the mixture.

The following preferred embodiment is illustrative of the ease with which water-repellent asbestos-cement shingles may be manufactured in accordance with the process of the invention:

A wet sheet of asbestos-cement having a thickness of 0.156 inch, of which the veneer represented a thickness of about 0.015 inch, was prepared on a conventional cylinder-type forming machine, using a base composition in which the solids content consisted of 80 percent by weight of Portland cement and 20 percent by weight of asbestos fiber and a veneer composition in which the solid content aggregated 60 percent by weight of Portland cement, 18 percent by weight of asbestos fiber, with the balance mineral oxides, pigments and extenders. The composite sheet was slowly passed under a battery of radiant heaters to reduce its moisture content to about 18 percent by weight.

The sheet, which was still in a wet, warm, and plastic condition, was textured by passing it through embossing rolls. It then was sprayed with an aqueous emulsion of thermoplastic acrylic copolymers at a rate such that about 0.9 gram per square foot of resinous solids was deposited on the sheet. The coating emulsion contained about 29 percent by weight of resinous solids plasticized with about 10 percent by weight of butyl Cellosolve (2-butoxyethanol). The resinous solids contained in the coating emulsion consisted of two parts by weight of a hard copolymer of methyl methacrylate and ethyl acrylate for each part by weight of a film-forming hydrophobic copolymer of methyl methacrylate and butyl methacrylate. The hard copolymer contained, in the polymer molecule, 90 percent by weight of methyl methacrylate, 10 percent by weight of ethyl acrylate, and 0.5 percent by weight of methacrylic acid; and the film-forming hydrophobic copolymer contained (in the polymer molecule) 25 percent by weight of methyl methacrylate and 75 percent by weight of butyl methacrylate.

The coated sheet was then cut into individual sections or units measuring 2' x 4'. These units were stacked on wooden pallets and partially cured to harden the asbestos-cement by storing them at room temperature for a period of eight hours. The cut units were still moist following such partial air-curing, but possessed sufficient rigidity to permit handling. The individual sheets were then punched and trimmed to final dimensions, restacked on pallets, and then introduced into a steam autoclave. There they were immersed in an atmosphere of high pressure saturated steam at a temperature ranging from about 280° F. to about 350° F. for a period of about eight hours to steam-cure the coated asbestos-cement sheets. During this steam-curing of the coated sheet, the resinous components of the coating were coalesced and fluxed into a continuous hydrophobic film which bonded integrally to the surface of the sheets. Upon completion of the steam cure, the film on the cured sheets was found to be distinctly hydrophobic in nature. It possessed excellent water-repellent properties and resistance to water strike-in, and was glossy in appearance and free from any embedded grit or dirt. Even after continued exposure to an outdoors atmosphere for periods ranging up to six months, the steam-cured coated shingles were virtually unchanged in appearance and had lost none of their water-repellent properties.

This application is a continuation-in-part of our copending application Serial No. 628,556, filed December 17, 1956 (now abandoned).

We claim:

1. The process for manufacturing a water-repellent asbestos-cement product coated with a continuous hydrophobic film of thermoplastic acrylic resins integrally bonded to its surface which comprises coating at least one of the surfaces of a sheet of asbestos-cement while it is still in a warm condition with an aqueous emulsion of thermoplastic acrylic copolymers including a film-forming hydrophobic copolymer of methyl methacrylate and an alkyl methacrylate in which the alkyl group contains from 4 to 12 carbon atoms, drying the emulsion to deposit a semicontinuous coating on the sheet, and then autoclaving the coated sheet in a saturated atmosphere of high pressure steam to steam-cure the coated asbestos-cement, thereby coalescing and fluxing the resinous components into a continuous hydrophobic film integrally bonded to the surface of the steam-cured asbestos-cement product.

2. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers including a film-forming hydrophobic copolymer of methyl methacrylate and an alkyl methacrylate in which the alkyl group contains from 4 to 12 carbon atoms, drying the emulsion to leave a semicontinuous coating on the sheet, partially curing the coated sheet to harden the asbestos-cement, and then autoclaving the partially cured coated sheet in a saturated atmosphere of high-pressure steam to steam-cure the coated asbestos-cement sheet, thereby coalescing and fluxing the resinous components into a continuous hydrophobic film integrally bonded to the surface of the steam-cured asbestos-cement product.

3. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers including a film-forming hydrophobic copolymer of methyl methacrylate and an alkyl methacrylate in which the alkyl group contains from 4 to 12 carbon atoms, said hydrophobic copolymer containing from 10 to 30 percent by weight of methyl methacrylate and from 70 to 90 percent by weight of the alkyl methacrylate, drying the emulsion to leave a semicontinuous coating on the sheet, partially curing the coated sheet to harden the asbestos-cement, and then autoclaving the partially cured coated sheet in a saturated atmosphere of high-pressure steam at a temperature ranging from about 280° F. to about 350° F. to steam-cure the coated asbestos-cement sheet, thereby coalescing and fluxing the resinous components into a continuous hydrophobic film integrally bonded to the surface of the steam-cured asbestos-cement product.

4. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers including a film-forming hydrophobic copolymer of methyl methacrylate and butyl methacrylate containing from 10 to 30 percent by weight of methyl methacrylate and from 70 to 90 percent by weight of butyl methacrylate, drying the emulsion to leave a semicontinuous coating on the sheet, partially curing the coated sheet to harden the asbestos-cement, and then autoclaving the partially cured coated sheet in a saturated atmosphere of high-pressure steam at a temperature ranging from about 280° F. to about 350° F. to steam-cure the coated asbestos-cement sheet, thereby coalescing and fluxing the resinous components into a continuous hydrophobic film integrally bonded to the surface of the steam-cured asbestos-cement product.

5. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid, and (b) a film-forming hydrophobic copolymer of methyl methacrylate and an alkyl methacrylate in which the alkyl group contains from 4 to 12 carbon atoms, said hydrophobic copolymer containing from 10 to 30 percent by weight of methyl methacrylate and from 70 to 90 percent by weight of the alkyl methacrylate, the ratio of the hydrophobic copolymer to the hard copolymer in the emulsion being from about 0.5:1 to about 10:1 parts by weight, drying the emulsion to leave a semicontinuous resinous coating on the sheet, partially curing the coated sheet to harden the asbestos-cement, and then autoclaving the partially cured sheet in a saturated atmosphere of high-pressure steam at a temperature ranging from about 280° F. to about 350° F. to steam-cure the coated asbestos-cement sheet, thereby coalescing and fluxing the resinous components into a continuous hydrophobic film integrally bonded to the surface of the steam-cured asbestos-cement product.

6. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid, and (b) a film-forming hydrophobic copolymer of methyl methacrylate and butyl methacrylate plasticized with 2-butoxyethanol and containing, in the polymer molecule, from 10 to 30 percent by weight of methyl methacrylate and from 70 to 90 percent by weight of butyl methacrylate, drying the emulsion to leave a semicontinuous resinous coating on the sheet, partially curing the coated sheet to harden the asbestos-cement, and then autoclaving the partially cured sheet in a saturated atmosphere of high-pressure steam at a temperature ranging from about 280° F. to about 350° F. to steam-cure the coated asbestos-cement sheet, thereby coalescing and fluxing the resinous components into a continuous hydrophobic film integrally bonded to the surface of the steam-cured asbestos-cement product.

7. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers to deposit thereon from 0.75 to 1.5 grams of resinous solids per square foot, the thermoplastic acrylic copolymers in the emulsion consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid and (b)

a plasticized film-forming hydrophobic copolymer of methyl methacrylate and an alkyl methacrylate in which the alkyl group contains from 4 to 8 carbon atoms, the hydrophobic copolymer containing, in the polymer molecule, from 10 to 30 percent by weight of methyl methacrylate and from 70 to 90 percent by weight of the alkyl methacrylate, the ratio of the hydrophobic copolymer to the hard copolymer in the film being from about 0.5:1 to about 10:1 parts by weight, partially curing the coated sheet to harden the asbestos-cement, and then autoclaving the partially cured sheet in a saturated atmosphere of high-pressure steam at a temperature ranging from about 280° F. to about 350° F. to steam-cure the coated asbestos-cement sheet, thereby coalescing and fluxing the resinous components of the semicontinuous film into a continuous hydrophobic film integrally bonded to the surface of the steam-cured asbestos-cement product.

8. The process for manufacturing a water-repellent asbestos-cement product coated with a continuous hydrophobic film of thermoplastic acrylic resins integrally bonded to its surface which comprises coating at least one of the surfaces of a freshly formed sheet of asbestos-cement while it is still in a wet, warm, and plastic condition with an aqueous emulsion of thermoplastic acrylic copolymers to deposit thereon from 0.75 to 1.5 grams of resinous solids per square foot, the thermoplastic acrylic copolymers in the emulsion consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid, and (b) a plasticized film-forming hydrophobic copolymer of methyl methacrylate and butyl methacrylate containing, in the polymer molecule, from 10 to 30 percent by weight of methyl methacrylate and from 70 to 90 percent by weight of butyl methacrylate, partially curing the coated sheet to harden the asbestos-cement, and then autoclaving the partially cured sheet in a saturated atmosphere of high-pressure steam at a temperature ranging from about 280° F. to about 350° F. to steam-cure the coated asbestos-cement sheet, thereby coalescing and fluxing the resinous components into a continuous hydrophobic film integrally bonded to the surface of the steam-cured asbestos-cement product.

9. An asbestos-cement product having at least one of its surfaces coated with and integrally bonded to a continuous hydrophobic film comprising a mixture of thermoplastic acrylic copolymers including a hydrophobic copolymer of methyl methacrylate and an alkyl methacrylate in which the alkyl group contains from 4 to 12 carbon atoms.

10. An asbestos-cement product having at least one of its surfaces coated with and integrally bonded to a continuous hydrophobic film comprising a mixture of thermoplastic acrylic copolymers including a hydrophobic copolymer of methyl methacrylate and an alkyl methacrylate in which the alkyl group contains from 4 to 12 carbon atoms, the hydrophobic copolymer containing from 10 to 30 percent by weight of methyl methacrylate and from 70 to 90 percent by weight of the alkyl methacrylate.

11. An asbestos-cement product having at least one of its surfaces coated with and integrally bonded to a continuous hydrophobic film comprising a mixture of thermoplastic acrylic copolymers including a hydrophobic copolymer of methyl methacrylate and butyl methacrylate containing from 10 to 30 percent by weight of methyl methacrylate and from 70 to 90 percent by weight of butyl methacrylate.

12. An asbestos-cement product having at least one of its surfaces coated with and integrally bonded to a continuous hydrophobic film comprising a mixture of thermoplastic acrylic copolymers consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid, and (b) a hydrophobic copolymer of methyl methacrylate and an alkyl methacrylate in which the alkyl group contains from 4 to 12 carbon atoms, the hydrophobic copolymer containing, in the polymer molecule, from 10 to 30 percent by weight of methyl methacrylate and from 70 to 90 percent by weight of the alkyl methacrylate, the ratio of the hydrophobic copolymer to the hard copolymer in the film being from 0.5:1 to 10:1 parts by weight.

13. An asbestos-cement product having at least one of its surfaces coated with and integrally bonded to a continuous hydrophobic film comprising a mixture of thermoplastic acrylic copolymers consisting essentially of (a) a hard copolymer of methyl methacrylate and ethyl acrylate containing, in the polymer molecule, from 80 to 90 percent by weight of methyl methacrylate, from 10 to 20 percent by weight of ethyl acrylate, and from 0.2 to 0.5 percent by weight of methacrylic acid, and (b) a hydrophobic copolymer of methyl methacrylate and butyl methacrylate containing, in the polymer molecule, from 10 to 30 percent by weight of methyl methacrylate and from 70 to 90 percent by weight of butyl methacrylate, the ratio of the hydrophobic copolymer to the hard copolymer in the film being from 0.5:1 to 10:1 parts by weight.

References Cited in the file of this patent

UNITED STATES PATENTS 2,778,283    Bettoli et al. _____ Jan. 22, 1957